(12) United States Patent
Boynes et al.

(10) Patent No.: US 11,488,180 B1
(45) Date of Patent: Nov. 1, 2022

(54) INCREMENTAL BUSINESS EVENT RECORDING

(71) Applicant: Amazon Technologies, Inc., Reno, NV (US)

(72) Inventors: Jeremy Boynes, Mercer Island, WA (US); Thomas Lowell Keller, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 565 days.

(21) Appl. No.: 14/161,568

(22) Filed: Jan. 22, 2014

(51) Int. Cl.
*G06Q 30/02* (2012.01)
*H04L 67/50* (2022.01)

(52) U.S. Cl.
CPC ....... *G06Q 30/0201* (2013.01); *H04L 67/535* (2022.05)

(58) Field of Classification Search
CPC .. G06Q 30/0201; G06Q 30/0246; G06F 8/73; G06F 11/079; H04L 67/535
See application file for complete search history.

(56) References Cited

U.S. PATENT DOCUMENTS

| | | | | |
|---|---|---|---|---|
| 5,164,988 A * | 11/1992 | Matyas | .................... | G06F 21/79 380/279 |
| 5,251,317 A * | 10/1993 | Iizuka | ....................... | G06F 9/52 710/220 |
| 6,269,150 B1 * | 7/2001 | Herrbach | ................ | H04M 3/22 370/244 |
| 6,741,967 B1 * | 5/2004 | Wu | ........................ | G06Q 30/02 705/1.1 |
| 7,031,981 B1 * | 4/2006 | DeLuca | ................. | G06F 3/0481 |
| 7,930,559 B1 * | 4/2011 | Beaverson | .......... | G06F 11/1453 713/193 |
| 9,043,456 B2 * | 5/2015 | Kuramoto | ........... | H04L 63/0823 709/219 |
| 9,081,987 B2 * | 7/2015 | Gormish | ................. | G06F 21/64 |
| 9,501,345 B1 * | 11/2016 | Lietz | ....................... | G06F 16/00 |
| 10,445,769 B2 * | 10/2019 | Mirisola | ............. | H04L 63/0421 |
| 2004/0117195 A1 * | 6/2004 | Bodin | .................... | G06Q 30/08 705/39 |
| 2006/0015850 A1 * | 1/2006 | Poole | ........................ | G06F 8/71 717/120 |
| 2006/0036660 A1 * | 2/2006 | Lynn | ................. | G06F 17/30368 |
| 2006/0259514 A1 * | 11/2006 | Weinrich | ............. | G05B 19/418 |

(Continued)

*Primary Examiner* — Rutao Wu
*Assistant Examiner* — Stephen S Swartz
(74) *Attorney, Agent, or Firm* — Davis Wright Tremaine LLP (57) ABSTRACT

Online retailers may operate a network of computing systems in order to provide an electronic marketplace to customers. The network of computing systems may be responsible for maintaining and providing different data to the customers of the online retailer. When a customer transmits a request to the online retailer the request may be divided into a set of tasks that may be executed in parallel by the computing systems. The data generated by executing the various tasks may be cached for various periods of time. Furthermore, log information may be generated based at least in part on execution of the various tasks. The logs may record data on initial access along with an identifier associated with the cached data. For subsequent tasks requiring cached data the log may include only the identifier associated with the cached data.

13 Claims, 9 Drawing Sheets

(56) References Cited

U.S. PATENT DOCUMENTS

| | | | |
|---|---|---|---|
| 2007/0078960 A1* | 4/2007 | Dawson | G06F 9/5072 709/223 |
| 2009/0077243 A1* | 3/2009 | Garg | H04L 67/14 709/228 |
| 2009/0204718 A1* | 8/2009 | Lawton | G06F 9/5016 709/230 |
| 2010/0088494 A1* | 4/2010 | Elnozahy | G06F 9/3863 712/228 |
| 2010/0110077 A1* | 5/2010 | Grossman | G06Q 10/06 345/440 |
| 2010/0145916 A1* | 6/2010 | Glebe | G06F 17/30336 707/687 |
| 2010/0161353 A1* | 6/2010 | Mayaud | G06F 19/3456 705/3 |
| 2011/0137762 A1* | 6/2011 | Pepe | G06Q 30/06 705/30 |
| 2011/0258434 A1* | 10/2011 | Qiu | H04L 9/006 713/153 |
| 2011/0276396 A1* | 11/2011 | Rathod | G06Q 10/00 705/14.49 |
| 2012/0005542 A1* | 1/2012 | Petersen | G06F 21/552 714/48 |
| 2012/0191703 A1* | 7/2012 | Huff | G06Q 10/063 707/722 |
| 2013/0179186 A1* | 7/2013 | Birtwhistle | G06F 17/30578 705/3 |
| 2013/0179480 A1* | 7/2013 | Agarwal | G06F 17/30115 707/822 |
| 2014/0032491 A1* | 1/2014 | Neerincx | G06F 17/30345 707/610 |
| 2014/0129942 A1* | 5/2014 | Rathod | H04N 21/44222 715/720 |
| 2014/0181130 A1* | 6/2014 | Davis | G06F 16/25 707/758 |
| 2014/0188829 A1* | 7/2014 | Ranganathan | G06F 17/30289 707/705 |
| 2014/0281131 A1* | 9/2014 | Joshi | G06F 12/0868 711/103 |
| 2015/0178769 A1* | 6/2015 | Mirisola | G06F 7/24 705/14.45 |

* cited by examiner

INCREMENTAL BUSINESS EVENT RECORDING

BACKGROUND

The use of electronic commerce websites has increased in recent years, allowing online retailers to offer goods and services for sale through the electronic commerce website. An electronic commerce website (also simply referred to as a website) for an online retailer may include one or more content pages for each category of items offered for consumption (e.g., purchase and/or download) by the online retailer, as well as content pages for individual items. Customers may interact with the online retailer's website via a browser executed by a computing device. Furthermore, customers of the online retailer may browse the website, following any number of links or other navigational features, including advertisements. When customers transmit requests for content or other interaction with the website, the request may be received by one or more servers of the online retailer. One or more logs may be generated based on fulfilling the request and may include information corresponding to the request. Furthermore, the log may include a record of key events such as a potential customer requesting particular content from the website. The online retailer may use the logs for various purposes such as attribution or diagnostics.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to log creation and correlation such that record size of log entries may be reduced while maintaining data integrity and quality. An online retailer may execute an application (such as an electronic commerce website or simply website), and execution of the application may cause a record of a key event such as a potential customer viewing a product or placing an order through the website to be created. The key event may include a request generated by a customer's web browser and transmitted over a network to servers or listening devices operated by the online retailer. The servers of the online retailer may process the request and create the record of the key event which may be included as an entry in logs maintained by the servers of the online retailer. The logs may contain all or a portion of pertinent information corresponding to the event. Further, the logs may contain duplicate or similar data being recorded simultaneously or duplicate or similar data previously recorded. Creating duplicate or similar log entries may lead to inefficiencies in data production, data collection and data processing. The logs may be created and/or pruned such that a reduction in the volume of data may be achieved through automatic, incremental data production and collection as well as the elimination of duplicate or redundant data. The method of log generation and correlation described herein may be applicable to a variety of different systems such as a system configured to obtain information and/or data from cached stores.

When processing a request (also referred to as a key event), the servers of the online retailer may sub-divide the work down into discrete tasks that might be executed in parallel or on other machines. For example, when displaying a product on the electronic commerce website, in response to a customer request, the one or more systems or services may sub-divide the work to retrieve the title and description from a catalog system, the price from a pricing system and the current inventory from an inventory control system. The data collected by the servers may change at different rates (for example, description monthly, price daily, and inventory with every order placed) and the server may cache portions of the data for different durations. The data stored in the cache may then be used when processing other requests or key events. Each portion of the data may have a unique identifier used as a cache key or task identifier, such as a uniform resource identifier (URI).

When creating a particular log entry corresponding to the processing or fulfillment of a particular request the particular server may record at least the data on initial access along with the cache key. For every subsequent request, the cache key is recorded without recording some or all of the data generated during processing of the request, thereby reducing the size of the record. During log processing, a correlation system may re-construct the effective data by correlating the cache keys and retrieving the original data. The data may be retrieved from the transaction record or from the origin server. In a component-based system where every component has a particular identifier, the log creation and correlation may be performed automatically, without the need to be specifically built by an application, thereby increasing the accuracy of the information at the same time as reducing implementation effort and time to market. Further, servers that may log duplicate copies of the data where some of the data is fetched from cache, may misattribute the costs of processing, unfairly penalizing the portion of the server or service that performed the original data access. By correlating all subsequent usages of the information from cache in the log generated by the servers, the initial retrieval cost can be amortized across all portions of the system that actually used the data.

The log may contain a series of log entries corresponding to requests and containing all of the data corresponding to the request. Furthermore, each log entry may contain a more granular stream of individual events, with each event representing a specific sub-division of the work. For example, a server may receive a request and sub-divide the work between two other servers. The server that received the request may create a log containing all of the data corresponding to the request and the two other servers may contain a log with all the data corresponding to processing the portion of the request completed by the particular server. Furthermore, the correlation system may be responsible for collecting and organizing all the logs such that the correlation system contains the log that contains all of the data corresponding to processing requests.

Figure 1:
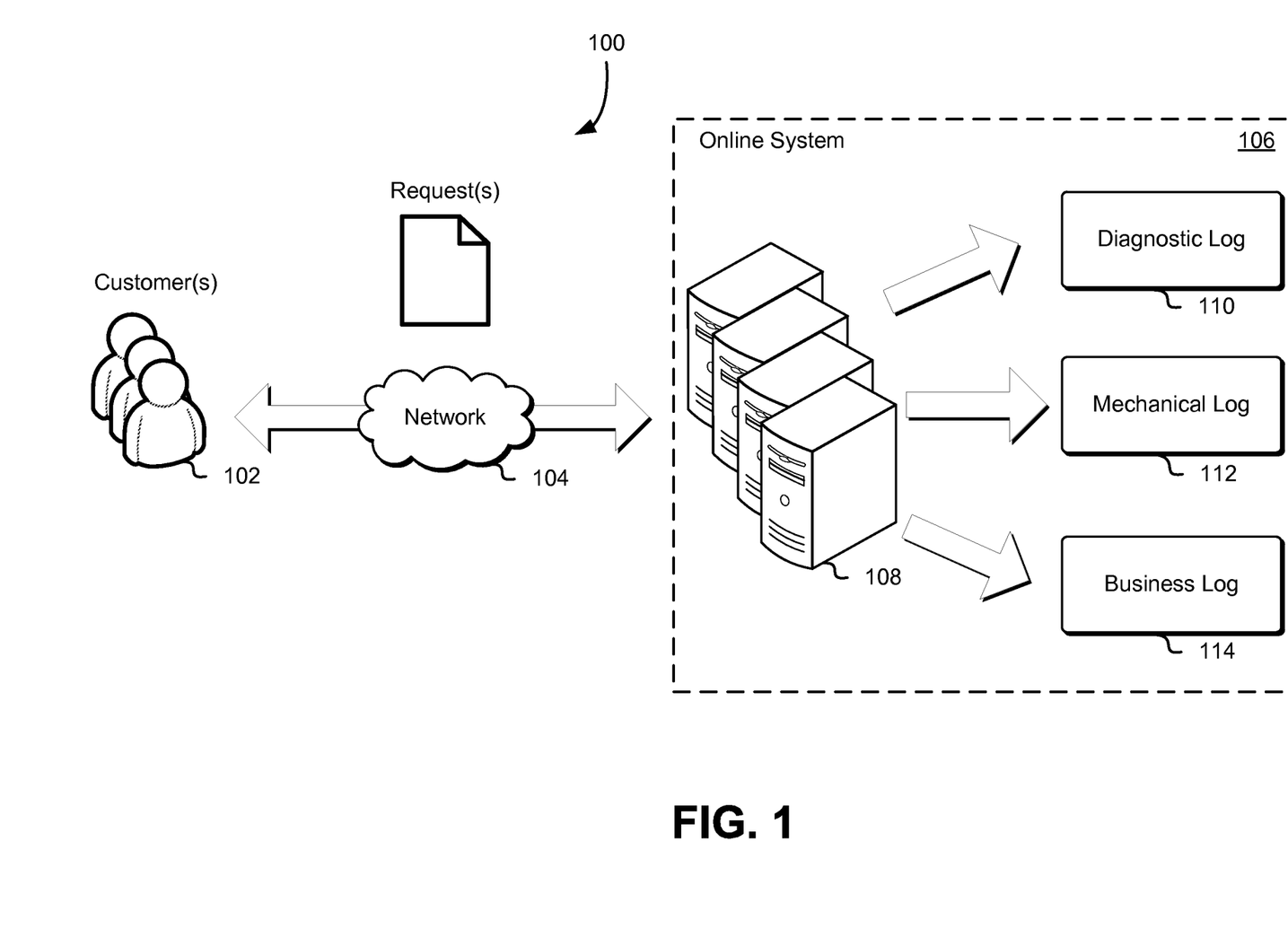
FIG. 1 shows an environment illustrating log generation and correlation in accordance with various aspects of the present disclosure.

Accordingly, FIG. 1 shows an example of an environment 100 that includes a customer transmitting a request to an online retailer and as a result of processing the request log information is generated by one or more servers of the online retailer. Customers 102 (also referred to as users) operate computing devices which may communicate over a network 104 with an online system 106 which, in some examples is an online retailer, although other online systems are considered as being within the scope of the present disclosure. The computing device operated by the customers 102 may be any suitable computing device such as a desktop, laptop, smartphone, tablet, electronic book reader, smart watch or other smart accessory (e.g., glasses) or any other device capable of interacting with an online system 106. The customers 102 may interact with the online retailer using a web browser or other application executed by the computing device. The network 104 may be any suitable network such as the Internet, a local area network, wide area network or any other suitable communications network and/or other networks noted herein and/or combinations of networks. To enable the customers 102 to interact with the online system 106, the computing device may transmit one or more Hypertext Transfer Protocol (HTTP) requests over the network to one or more web servers 108 operated by the online system 106. The web servers 108 may be responsible for delivering the website and associated content to the customer 102 through computing devices in response to the one or more HTTP requests received over the network.

The web servers 108 may generate log information based at least in part on fulfilling the customers 102 request and delivering the website and associated content to the customers 102. Log information may be organized into at least three different logs a diagnostic log 110, a mechanical log 112 and a business log 114. Each log may contain a portion of, or all of the data from one or more other logs, there may be one entry per request received from the customers 102 and the logs may include data corresponding to the time of the request and information identifying the request along with the log data generated by the web servers 108. The diagnostic log 110 may include information corresponding to the success or failure of a particular operation performed in response to requests received from the customers 102. For example, the diagnostic log may include information corresponding to HTTP error encountered by the web servers 108 during processing of the requests.

The mechanical log 112 may include information corresponding to operations performed in response to the requests received from the customers 102. For example, the mechanical log 112 may include information corresponding to back-end processing requests transmitted by the web servers 108 in order to fulfill a particular request, such as a request to an inventory service for information corresponding to an item included in the particular request. The mechanical log 112 may also include information corresponding to the amount of time and resources utilized to fulfill and/or process the requests. Returning to the example above, the mechanical log may include the amount of processor time and memory utilized in generating and transmitting the back-end processing request to the inventory service. The mechanical log 112 may include information corresponding to cache keys or other information indicating that data used to process the request was retrieved from cache. Therefore, the mechanical log 112 may indicate the portion of the data used in fulfilling the requests received from the customers 102 that originated in the cache and the portion of the data that was received from one or more back-end services.

The business log 114 may include information corresponding to business events such as content viewed by customers 102 or an item purchased by a particular customer. For example, the business log 114 may include the navigation history of a particular customer preceding a request to purchase an item offered for consumption on the website operated by the online system 106. The business log 114 may include information corresponding to a price charged for the item offered for consumption and the price information may be used for determining attribution and profit. The diagnostic log 110, the mechanical log 112 and the business log 114 may contain a record of all or a portion of the key events occurring during the processing of requests from customers 102. One or more other logs may be used in accordance with the present disclosure as well as condensing or including one or more of the logs described above into another log. For example, the diagnostic log 110, the mechanical log 112 and the business log 114 described above may be included in a single log.

Figure 2:
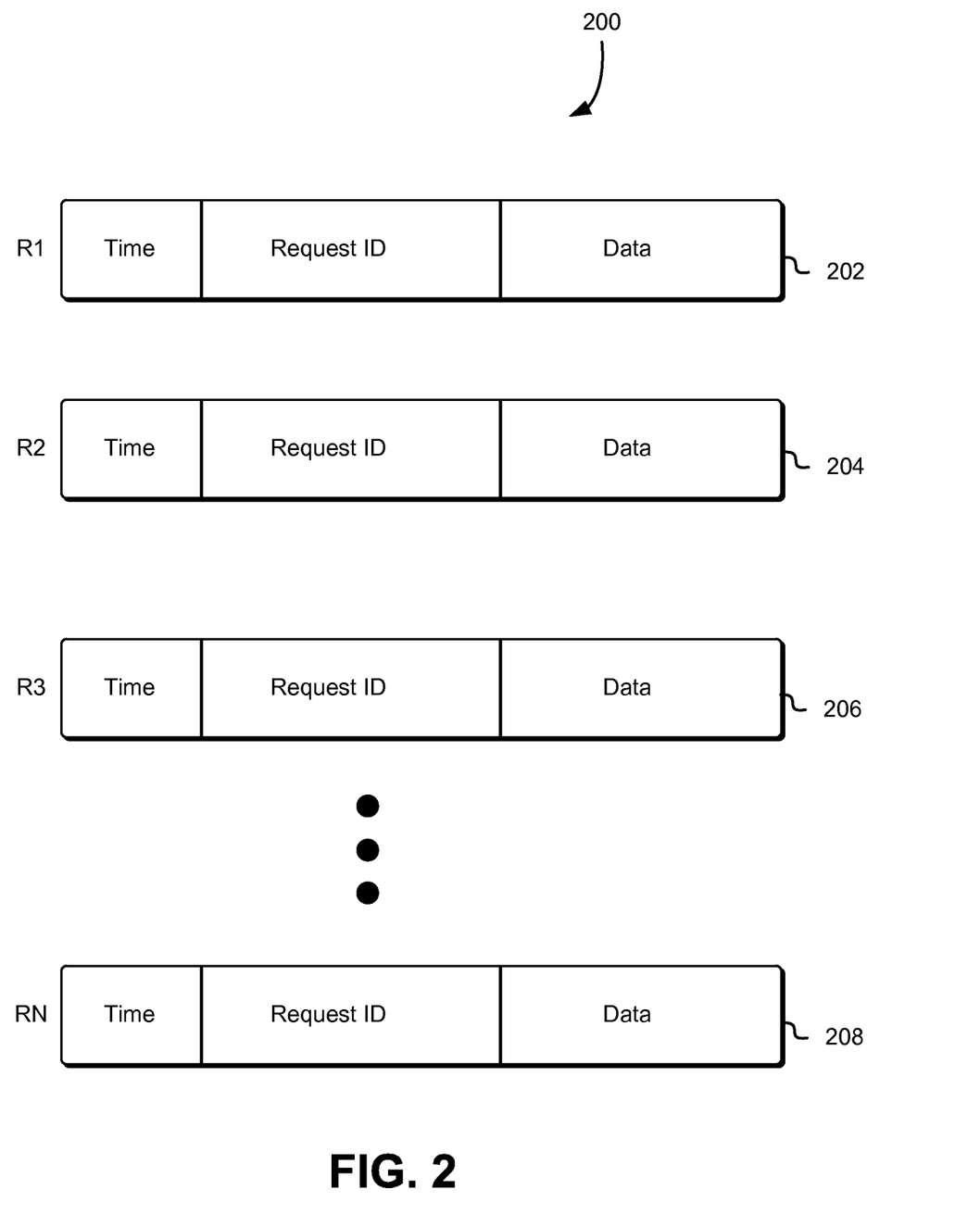
FIG. 2 shows a diagram illustrating log entries in accordance with various aspects of the present disclosure.

FIG. 2 shows a diagram 200 illustrating log entries in accordance with various aspects of the present disclosure. The log entries 202-208 may be generated by one or more servers such as the web servers described above in connection with FIG. 1. The log entries 202-208 may include one or more fields as shown in FIG. 2, including time, request ID and data. Although only three fields are shown in FIG. 2, any number of suitable fields or sub-fields may be used. Returning to FIG. 2, the time field may indicate the time the request was received by the particular server processing the request. In various embodiments, the field includes information corresponding to the time the request was generated by the customer, such as a time stamp included in an HTTP request to the online retailer.

The request ID may include identification information capable of identifying the particular request corresponding to the log entry. For example, the request ID for log entry 202 may include a URI configured to identify the particular request for which log entry 202 corresponds. The request ID may be generated by the service or server generating the log or may be generated by another service or server of the online retailer. If the request ID is generate by another service or server of the online retailer, the generated request ID may be included in the request. For example, if the web server described above is responsible for generating the request ID, the request ID may then be included in any request to a back-end system, such as the inventory service described above in FIG. 1.

Each log entry 202-208 may correspond to one request and may be capable of identifying the particular corresponding request. The log entries 202-208 may also include data corresponding to the request. The data may include diagnostic, mechanical and/or business data as described above in connection with FIG. 1. For example, the log illustrated by diagram 200 may be generated by a back-end system such as the inventory service. The inventory service may receive a request at a particular time and enter the particular time in the time field of log entry 206. The request ID may be generated by the inventory service and entered into the request ID field of log entry 206. The inventory service may then enter diagnostic data into the data field of log entry 206 indicating where processing of the request completed successfully.

The data entered into log entries 202-208 may be any suitable data generated or received by the service or server corresponding to the request. The data may include information corresponding to whether the request was processed successfully and without errors or warnings. The data may also include information corresponding to the processing of the request such as what operations were executed during processing, the duration of the executed operations, the resources consumed by the execution of the operations and any other data corresponding to the processing of the request. The data may also include information corresponding to the customer or service responsible for transmitting the request. For example, the data may include customer identification information or session identification information. The session identification information may include information corresponding to a particular customer's navigational session such as the web pages viewed by the particular customer, advertisements clicked on by the particular customer, navigational links selected by the particular customer, affiliate programs responsible for navigating the customer to the particular web page associate with the request or any other information corresponding to a particular customer's session.

Figure 3:
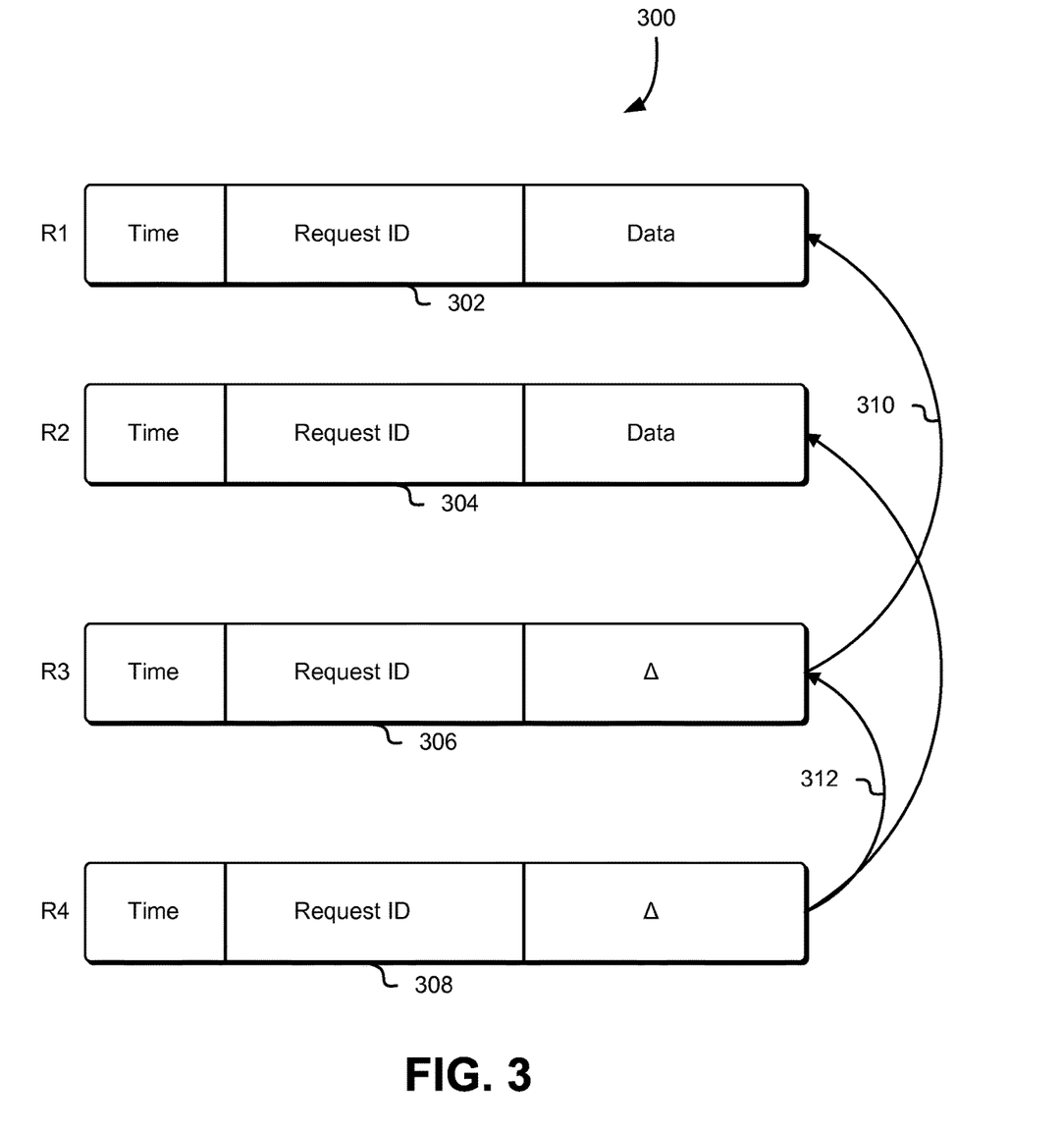
FIG. 3 shows a diagram illustrating log entries in accordance with various aspects of the present disclosure.

FIG. 3 shows a diagram 300 illustrating log entries in accordance with various aspects of the present disclosure. The log entries 302-308 may be generated by a correlation system described in further detail below in reference to FIG. 4. Still in accordance with the present disclosure, the log entries 302-308 may be generated by the particular server or service responsible for processing the request corresponding to the particular log entry. The log entries 302-308 may then be transmitted to the correlation system. The correlation system may receive one or more other logs from various servers of the online retailers and correlate the information contained in the log. Correlating the logs may include pruning the log by removing repeated data and linking entries to one or more previous log entries containing the repeated information. For example, log entry 306 may be linked to log entry 302 with link 310.

The log illustrated by diagram 300 may be generated by a server or service of the online retailer and may include the time the request was received, identification information corresponding to a particular request and data corresponding to the particular request. Furthermore, the log illustrated in FIG. 3 may contain the change in data between log entries (represented by the Greek letter delta in FIG. 3) and links 310 and 312 to previous log entries, where the previous log entries contain at least a portion of the data for the log entry. For example, log entry 308 may contain a link 312 to log entry 306. The delta field of log entry 308 may contain the change in data between log entry 306 and log entry 308. The data common to both log entry 306 and log entry 308 may be contained in log entry 306 and may not be duplicated in log entry 308, thereby reducing the total amount of data contained in the log illustrated by diagram 300.

The links between log entries may be chained such that log entries may be linked to more than one other entry that share common data. Returning to the example above, log entry 308 may be linked to log entry 306 and log entry 306 may be further linked to log entry 302 over link 310. Therefore log entry 306 may contain the change in data between log entry 302 and log entry 306 and log entry 308 may contain the incremental change between log entry 306 and log entry 308. The links 310 and 312 may enable one or more servers of the online retailer, such as the correlation system, to retrieve data associated with log entries 308 and 306. Log entries 302-308 may contain multiple links to previous log entries. For example, as shown in FIG. 3, log entry 308 contains a link 312 to log entry 306 and another link to log entry 304. Log entry 308 may then contain the change in data between both log entry 306 and log entry 308 and log entry 304 and log entry 308.

The log entries 302-308 may be generated in response to a received request; the data and other information for the log entries 302-308 may be collected and then the data and other information may be pruned such that the change in data between various log entries is recorded and stored in the log illustrated by diagram 300. For example, a first request R1 may be received by a web server for a web page containing detailed information about an item offered for consumption on the electronic marketplace operated by the online retailer. The log entry 302 may be generated corresponding to the first request R1 and containing information corresponding to the request such as whether the request was fulfilled successfully, resources consumed by processing the request, a particular customer associated with the request, an outcome of the request or any other suitable data corresponding to the request. For example, the web server may transmit multiple requests to back-end systems of the online retailer in order to retrieve data required to fulfill the request, information corresponding to the requests, the data received and where the received data is stored in cache may be included in the log entry 302.

Another request R3 for the web page containing detailed information about the item offered for consumption may be received. The web server may then process the request by retrieving at least a portion of the data required to fulfill the request from the cache and transmit one or more requests to the back-end system for the required data not already contained in the cache. For example, the web server may retrieve the item description and images of the item from cache and may transmit a request to the inventory service in order to determine the inventory of the item for display on the web page. The web server may then generate log entry 306 corresponding to the other request R3 such that the log entry 306 contains at least the difference between the data stored in log entry 302 and the data generated by processing the other request R3. Returning to the example above, the log entry 306 may contain at least the data corresponding to the request to the inventory service and the cache keys corresponding to the item description and images of the items retrieved from cache. Log entry 306 may further include a link 310 to log entry 302. The link may indicate that at least a portion of the data used to fulfill request R3 was generated in response to request R1 and stored in cache.

Figure 4:
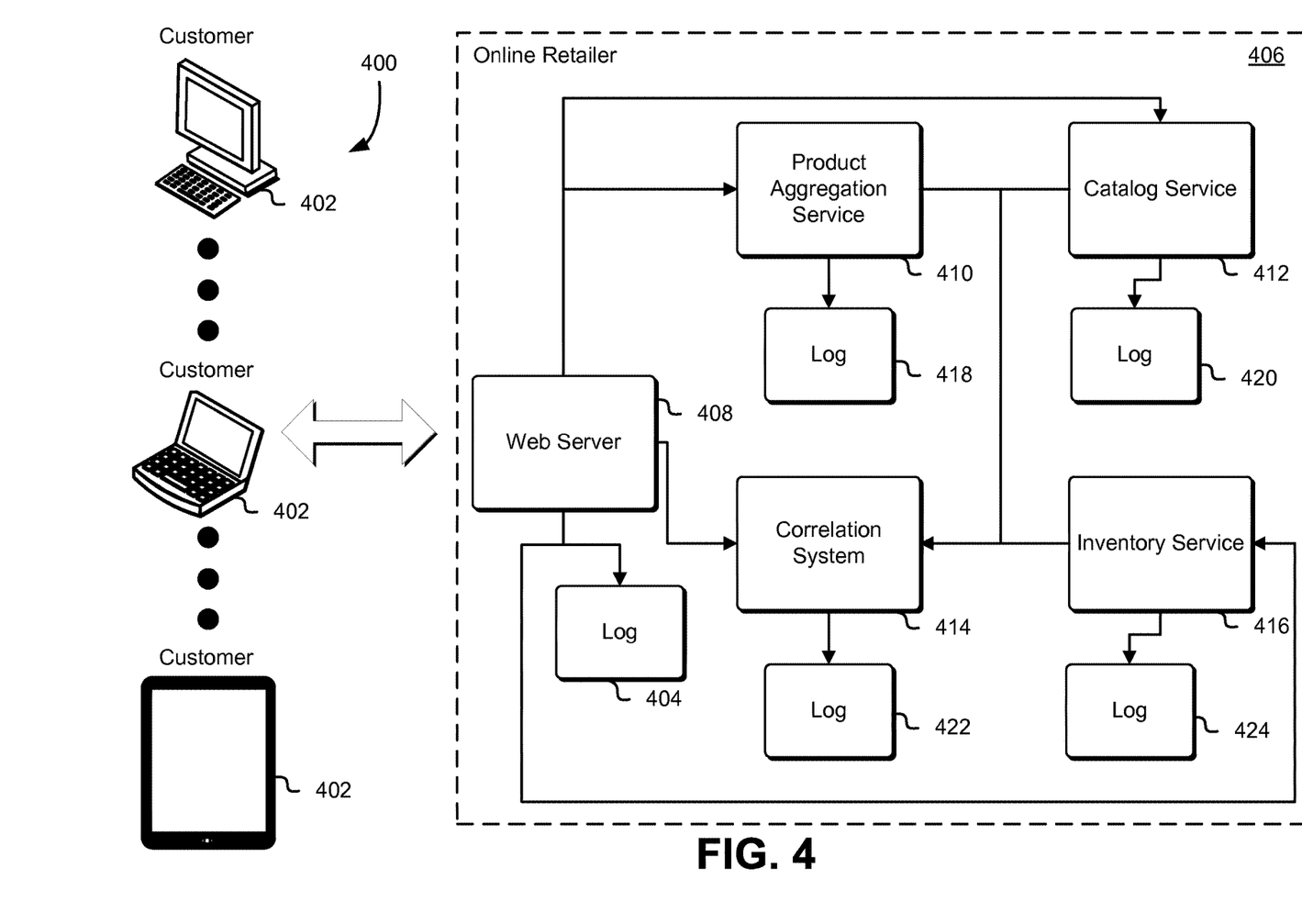
FIG. 4 shows an environment illustrating log generation and correlation in accordance with various aspects of the present disclosure.

FIG. 4 shows a diagram illustrating log generation and correlation in accordance with various aspects of the present disclosure. In particular, FIG. 4 shows environment 400 which illustrates an example of customers interacting with an online retailer 406 through a variety of different computing devices 402. The customers interacting through the different computing devices may be the same or different customers. For example, a customer may initiate a browsing session on a lap top and continue the browsing session on a mobile device.

Interactions with the online retailer 406 may include the computing devices 402 generating and transmitting requests to the online retailer 406. The request may be received by a listening device operated by the online retailer 406 or one or more web servers 408 operated by the online retailer 406. The request may be transmitted to a server or service responsible for processing the particular request. Furthermore, in processing the particular request the server or service responsible for processing the particular request may generate and/or transmit one or more other requests in order to fulfill the particular request. For example, the server or service may divide the work required to fulfill the request into at least two discrete tasks and transmit a request to at least one server or service to complete at least one of the discrete tasks.

In response to receiving the request, the online retailer 406 or a server or service operated by the online retailer 406 may process the request. Processing the request may include retrieving data from cache, requesting data from one or more other servers of the online retailer 406, determining data to be used in response to the request or other operations suitable for processing the request. The server or service responsible for processing the request may generate log information corresponding to processing the request. For example, the one or more web servers 408 may generate a log 404 containing information corresponding to received requests. The web servers 408 may generate the log 404 as described above in connection with FIG. 3. The web servers 408 may also publish the log 404 as a stream to the correlation system 414.

The correlation system 414 may be a collection of computing resources (e.g., servers, storage devices, networking devices, workstations, virtual machine instances or computing systems) collectively configured to correlate and manage one or more logs received from various servers or service of the online retailer 406. The correlation system may be configured to collect information corresponding to one or more requests based at least in part on the information contained in the log, including links between log entries as described above in connection with FIG. 3. Users may interact with the correlation system in order to perform a variety of different operations such as correcting errors, collecting data or making business decisions. The users may interact with the correlation system through a management console or similar interface and may be presented to the users as a web page. The users access the web page through a web browser or other appropriate application and the web browser may generate application programming interface (API) calls configured to cause the correlation system to perform one or more operations in response to the API call. For example, a technician may interact with the correlation system 414 in order to resolve errors in one or more servers of the online retailer 406. The technician may retrieve log information from the correlation system and follow links between log entries.

The product aggregation service 410 may be a collection of computing resources collectively configured to collect and distribute data associated with products and services offered for consumption by the online retailer 406. The product aggregation service 410 may collect information corresponding to goods or services offered for consumption on the electronic marketplace operated by the online retailer 406 by transmitting API requests to one or more other services of the online retailer 406. The product aggregation service 410 may also store log 418 information corresponding to operations performed in response to requests received. For example, the product aggregation service 410 may receive a request corresponding to a particular customer using computing device 402 to view an item offered for consumption. Web servers 408 may receive the request and request at least a portion of the data corresponding to the item offered for consumption from the product aggregation service 410. The product aggregation service 410 may respond to the request with the requested data and store log information corresponding to the request in log 418. The log information may include one or more cache keys, URIs or other identifiers configured to link one or more previous log entries to the log information being written to log 418.

The catalog service 412 may be a collection of computing resources collectively configured to catalog items offered for consumption, including pricing information. The catalog service 412 may receive pricing requests and store log information corresponding to the requests in log 420. Similarly, the inventory service 416 may be a collection of computing resources collectively configured to track inventory of items offered for consumption by the online retailer 406. The inventory service 416 may also log information corresponding to inventory requests in log 424. The product aggregation service 410, the catalog service 412, the inventory service 416 and other services operated by the online retailer may periodically transmit all or a portion of their respective logs to the correlation system 414. These services may also transmit URIs or other identifiers to the correlation system 414, such that the identifiers are configured to enable the correlation system to retrieve log information from the services' corresponding logs. For example, the inventory service may transmit a portion of the log 424 to the correlation system 414 and URIs for the remaining log information. The correlation system 414 may use the URIs to retrieve the log information when needed.

Figure 5:
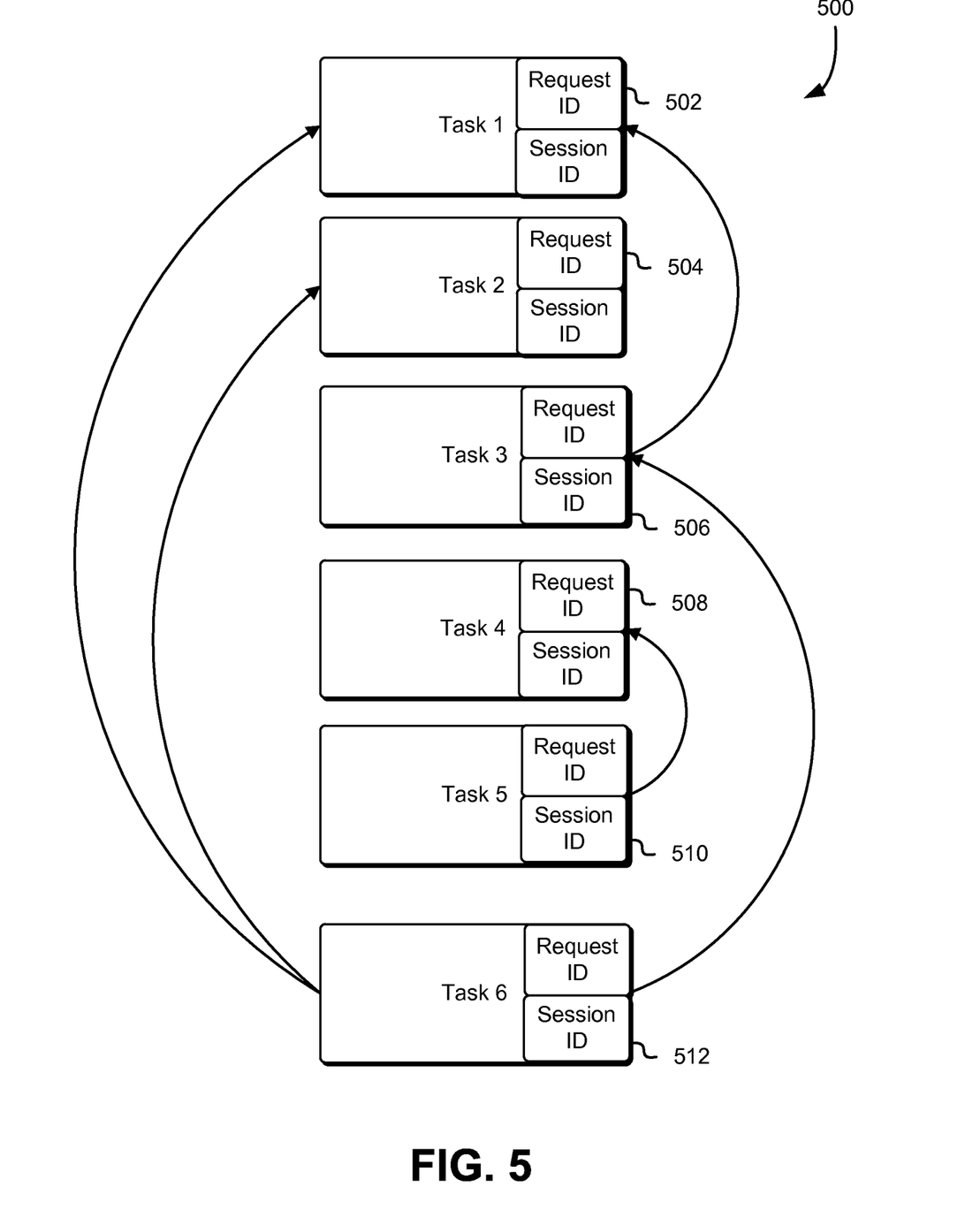
FIG. 5 shows a diagram illustrating log entries in accordance with various aspects of the present disclosure.

FIG. 5 shows a diagram 500 illustrating log entries in accordance with various aspects of the present disclosure. Log entries 502-512 may be generated by one or more services of the online retailer and may be organized by the correlation system. Log entries generated in response to requests may be broken down into discrete tasks performed in order to fulfill the request. Diagram 500 may illustrate a set of discrete tasks performed in order to complete a single request or multiple requests. The request may be generated over a single session by a user or several sessions by different users. Each task may be performed by the same or different services of the online retailer.

For example, log entry 502 may correspond to a discrete task such as requesting product information from a product aggregation service. Log entry 502 may be associated with a request ID and a session ID. Both the request ID and the session ID may be URIs configured to identify a particular request or session. Log entry 504 may contain the same request ID and/or session ID as log entry 502. For example, log entry 502 may correspond to a request to view a web page with detailed product information and may also contain information corresponding to a task performed in response to the request, such as retrieving price information from the catalog service. Log entry 504 may correspond to the same request to view the web page with detailed product information, but may contain information corresponding to a different task performed in response to the request, such as retrieving inventory information from the inventory service.

Log entries and corresponding tasks may also be linked to one or more other log entries. For example, log entry 506 may be linked to log entry 502 as illustrated in diagram 500.

Log entry 506 may contain a different request ID as log entry 502, however data retrieved in response to the request corresponding to log entry 502 may be used in response to the request corresponding to log entry 506. Returning to the example above, log entry 502 may correspond to the request to view the web page with detailed product information. Log entry 506 may correspond to a different request to view the same web page with detailed product information. The online retailer or a service of the online retailer may cache the information from the first request corresponding to log entry 502 and generate a cache key configured to identify log entry 502 indicating where the data was first processed before being stored in cache. Log entry 506 may then contain the generated cache key indicating that the data used to fulfill the corresponding request was processed and stored in cache in response to the request corresponding to log entry 502.

Figure 6:
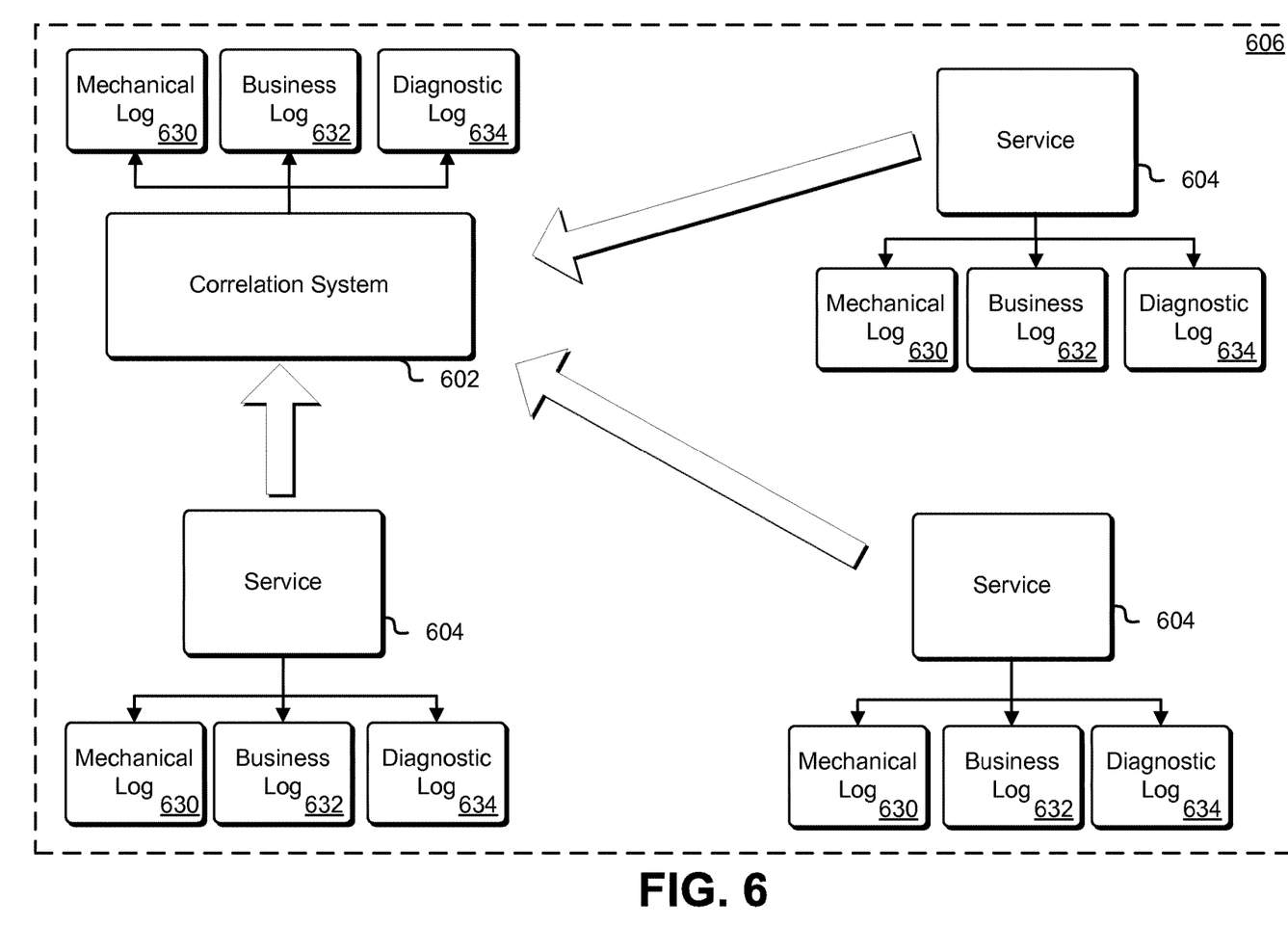
FIG. 6 shows an environment illustrating log generation and correlation in accordance with various aspects of the present disclosure.

FIG. 6 shows an environment which illustrates an example of log generation and correlation in accordance with the present disclosure. In particular, FIG. 6 shows a correlation system 602 receiving log information from multiple services 604 of an online retailer 606. The correlation system 602 may receive the log information as a data stream directly from the service responsible for generating the log or from another service configured to receive log information on behalf of the correlation system 602. The correlation system 602 may include one or more storage systems configured to store log information. Furthermore, the correlation system 602 may place the received log information into one or more logs such as the mechanical log 630, business log 632 and diagnostic log 634 as described above in connection with FIG. 1.

The correlation system 602 may perform various operations on the logs received from the multiple services 604 based at least in part on information contained in the logs. The information contained in the log may include request IDs, session IDs, task information, cache keys, URIs and any other information associated with processing a request. The correlation system 602 may prune data in the log and/or correlate log entries such that information contained in the log entries is not replicated or duplicated across multiple log entries. The correlation system 602 may also enable the user to retrieve log information in an organized linked graph as illustrated in FIGS. 3 and 5. Furthermore, the linked graphs may enable the user to determine the source or origin of data contained in the logs. The correlation system 602 may generate the correlated logs automatically and store the log in one or more storage systems.

Figure 7:
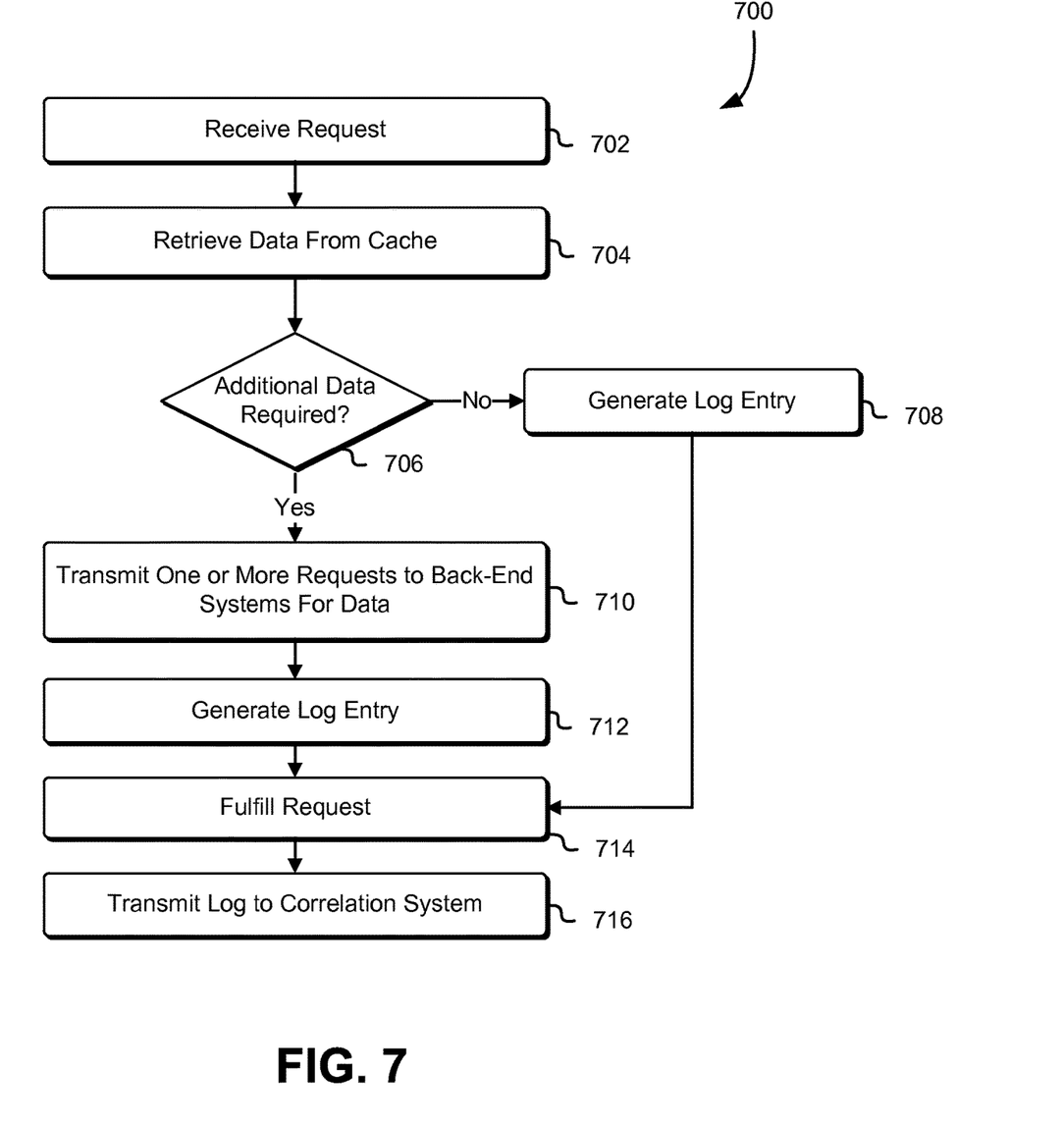
FIG. 7 shows an illustrative example of a process for generating logs in accordance with at least one embodiment.

FIG. 7 shows an illustrative example of a process 700 which may be used to respond to user requests and generate log information that may be used by the correlation system. The process 700 may be performed by any suitable system, such as the one or more web servers, as described above in connection with FIG. 1. Returning to FIG. 7, in an embodiment, the process 700 includes receiving a request. The request may be received over a network at the web server or at a listening device operated by the online retailers and may be directed to one or more server or service of the online retailer. For example, the request may be received at the listening device and the listening device may determine one or more discrete tasks required to fulfill the request and a particular service configured to perform each discrete task. The listening device may forward at least the portion of the request corresponding to a particular discrete task to the service responsible for performing the particular discrete task.

Returning to FIG. 7, once the request has been received, the web server or other service processing the request may determine data required to fulfill the request and retrieve the data from cache 704. The data retrieved from cache may be associated with a cache key or other identifier corresponding to one or more log entries and/or requests which may have caused the data to be stored in cache. Still, in accordance with the present disclosure, the web server may determine that none of the data required to fulfill the request are stored in cache. However, if all the required data to fulfill the request 706 are stored in cache or can otherwise be generated by the web server without requesting additional data for one or more back-end systems, the webserver may generate a log entry 708 and fulfill the request 714. The log entry may contain a variety of information such as the time the request was received, information configured to identify the request, information configured to identify a user associated with the request, information configured to identify a browsing session associated with the request, information configured to identify data used in fulfilling the request, a cache key, or other information configured to identify a memory location of the data.

If the web server requires additional data 706 to fulfill the request, the web server may transmit one or more requests to back-end systems for the additional data 710. For example, the web server may transmit a request to the inventory service to determine the current inventory of an item offered for consumption by the online retailer. The request may be an API call including information configured to identify the request and a request for the data required. The web server may receive, in response to the one or more requests, the data required. The web server may then generate a log entry 712; the log entry may include the time the request was received, information configured to identify the request, information configured to identify a user associated with the request, information configured to identify a browsing session associated with the request, information configured to identify data used in fulfilling the request, information configured to identify a memory location of the data, information configured to identify the one or more requests transmitted to the one or more back-end systems or any other log information suitable for recording the activities of a computer system.

Once the data has been received by the web server, the web server may then fulfill the request 714. Fulfilling the request may include transmitting the request data to the user. In various embodiments fulfilling the request may include transmitting data to one or more other services of the online retailer. For example, process 700 may be performed by the inventory service of the online retailer and may transmit information to another service or server of the online retailer such as the web server described above. The web server or other service performing process 700 may transmit the generated log to the correlation system 716. The log may be transmitted periodically or once a threshold number of entries have been reached. Log entries may also be transmitted individually.

Figure 8:
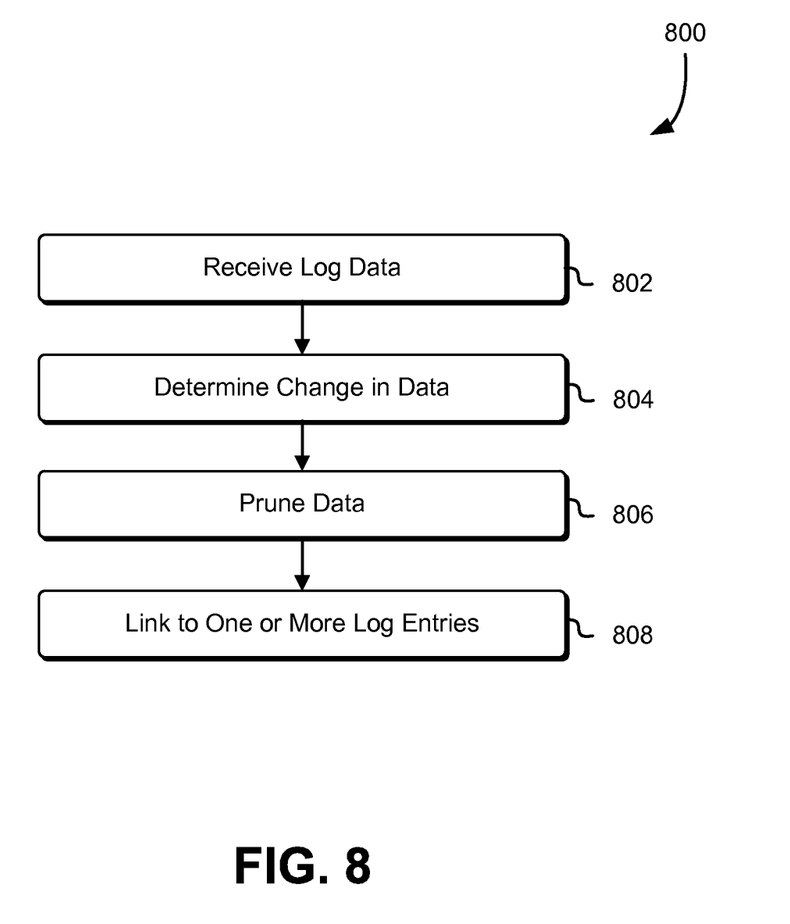
FIG. 8 shows an illustrative example of a process for correlating logs in accordance with at least one embodiment.

FIG. 8 shows an illustrative example of process 800 which may be used to generate logs and link log entries such that the amount of data stored in the log may be reduced. The process 800 may be performed by any suitable system, such as the correlation system, as described above in connection with FIG. 4. Returning to FIG. 8, in an embodiment, the process 800 includes receiving log data 802. The log data may be received from one or more services of the online retailer or may be generated by the service performing process 800. The correlation system may then determine the change in the data 804 in the received logs. For example, the log data may contain two or more entries corresponding to a different request for the same or nearly the same data such as different views of the same webpage. The correlation system may determine what data if any is different between the log entries.

The correlation system may then prune the data 806 contained in the received logs based at least in part on the determination of what data has changed between the log entries. Pruning the data may include deleting or removing redundant or replicated data between the entries. For example, two or more log entries may contain information corresponding to the same data retrieved from the media service of the online retailer and stored in cache. The correlation system may then remove the duplicate data and replace the duplicate data with links to one or more other entries 808. The links may point to entries corresponding to when the data was first retrieved and stored in cache. For example, the link may point to a log entry corresponding to a request for a video clip from the media service. The video clip may be stored in cache of a web server responsible for fulfilling the request. Further requests for the same video clip may be fulfilled from cache, and the log entries corresponding to the further requests may be linked to the initial request corresponding to the video clip being stored in cache.

Figure 9:
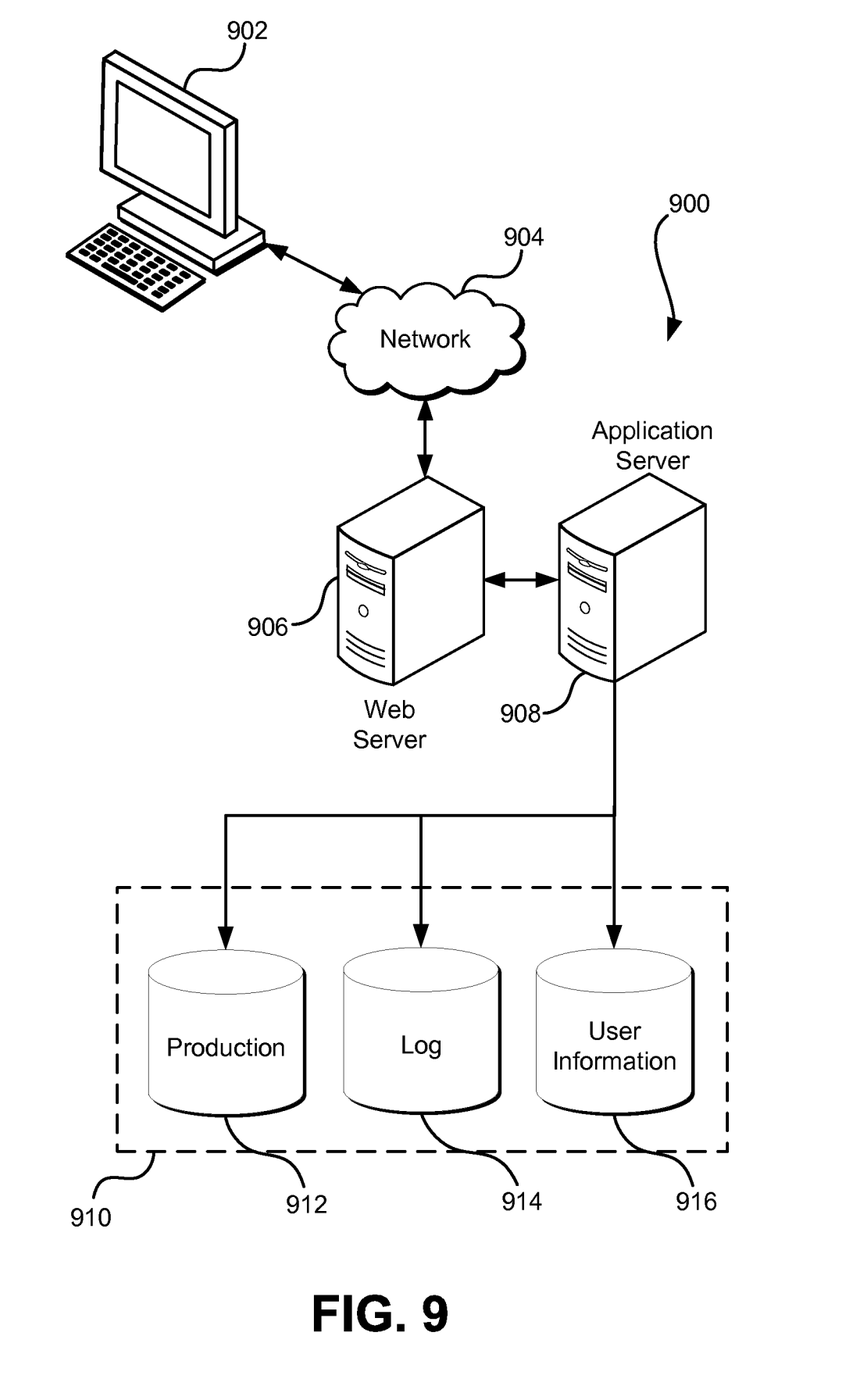
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
generating a task identifier as part of fulfilling a first request, the task identifier being a unique identifier associated with at least one other request and data obtained as a result of fulfilling the at least one other request, the first request associated with interaction with a web browser by a user;
generating a first log entry such that the task identifier is contained in the first log entry and points to at least one other log entry, where the at least one other log entry is associated with the at least one other request and comprises data obtained as a result of processing the at least one other request, the first log entry further including a first cost associated with resource usage used to fulfill the first request, the first log entry associated in a log comprising information based at least in part on fulfilling user requests obtained through one or more user interfaces and content delivered to users based on the user requests;

storing the first log entry in a first memory;

fulfilling a second request by at least:
tracing the task identifier contained in the first log entry to the at least one other log entry associated with the at least one other request;
retrieving, using the task identifier, at least a portion of data from the first memory;
providing the portion of data in response to the second request;
creating a second log entry associated with the second request, the second log entry including the task identifier, the second log entry further including a second cost associated with resource usage used to fulfill the second request; and
storing the second log entry in a second memory;

determining a correlation between the first and second log entries, the correlation indicating at least first data of the first log entry and second data of the second log entry are the same; and in response to determining the correlation between the first and second log entries, linking the second log entry to the first log entry by altering the second log entry to at least remove the second data from the second log entry.

2. The computer-implemented method of claim 1, wherein the computer-implemented method further includes:
retrieving diagnostic data from the first log entry and the second log entry; and
performing at least one operation based at least in part on the diagnostic data.

3. The computer-implemented method of claim 2, wherein the computer-implemented method further includes publishing the first log entry and the second log entry to a stream corresponding to a correlation system.

4. The computer-implemented method of claim 3, wherein the computer-implemented method further includes:
providing information based at least in part on the correlation to a different user, and wherein linking the second log entry to the first log entry comprises altering the second log entry so that the second log entry references the first log entry.

5. The computer-implemented method of claim 1, wherein the at least one other log entry is stored in at least one other computer system of one or more computer systems not responsible for fulfilling the first request.

6. A system, comprising:
one or more processors; and
memory with instructions that, if executed by the one or more processors, cause the system to:
receive a first request, the first request associated with interaction with a web browser by a user;
generate a key that identifies a task performed by the system as a result of processing the first request;
generate a first log entry containing the key and information corresponding to processing the first request, the first log entry further including a first cost associated with resource usage used to fulfill the first request, the first log entry associated in a log comprising information based at least in part on fulfilling user requests obtained through one or more user interfaces and content delivered to users based on the user requests;
store the first log entry in a first memory;
receive a second request;
process the second request based at least in part on data stored in the first memory;
generate a second log entry associated with the second request including the key, as a result of processing the second request having used a result of the task, based at least in part on the data stored in the first memory, the second log entry further including a second cost associated with resource usage used to fulfill the second request;
store the second log entry in a second memory;
determine an association between the first and second log entries; and
in response to determining the association between the first and second log entries, link the second log entry to the first log entry by altering the second log entry so that the second log entry references the first log entry, and further altering the first log entry or the second log entry to remove data determined to be the same between the first log entry or the second log entry.

7. The system of claim 6, wherein the first log entry and the second log entry are linked based at least in part on the key.

8. The system of claim 6, wherein the key contained in the second log entry enables the system to retrieve information from one or more other log entries based at least in part on the key.

9. The system of claim 6, wherein the memory further includes instructions that, if executed by the one or more processors, cause the system to:
retrieve from another system a third log entry based at least on a second key wherein the third log entry corresponds to an initial request and the second key corresponds to another task performed in order to fulfill the initial request; and
link the first log entry and the third log entry.

10. The system of claim 9, wherein the memory further includes instructions that, if executed by the one or more processors, cause the system to publish the first log entry, the second log entry, and the third log entry to a correlation system.

11. The system of claim 10, wherein the correlation system removes at least a portion of data from the second log entry that is duplicated from the first log entry or the third log entry.

12. The computer-implemented method of claim 1, wherein the computer-implemented method further includes attributing an additional value to the second request based at least in part on obtaining a second portion of the data to process the second request.

13. The system of claim 6, wherein the memory further includes instructions that, if executed by the one or more processors, cause the system to attribute at least a portion of a value to the second log entry based at least in part on obtaining additional data to process the second request.

\* \* \* \* \*